Dec. 3, 1929.     G. M. LEWIS     1,737,596
AIRPLANE
Filed July 13, 1929
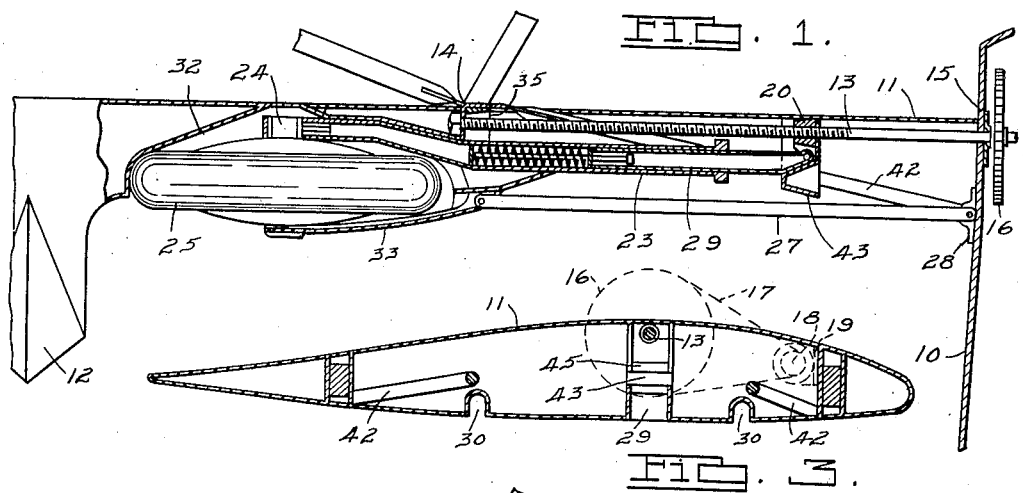
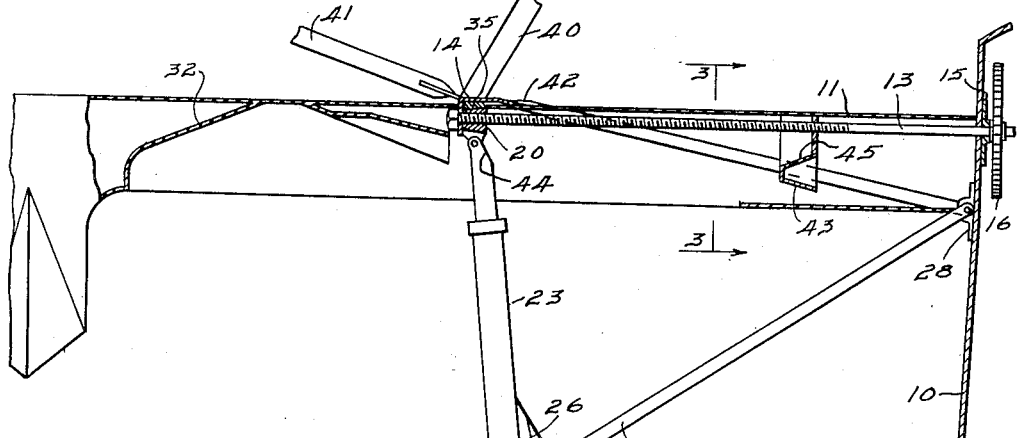
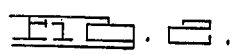
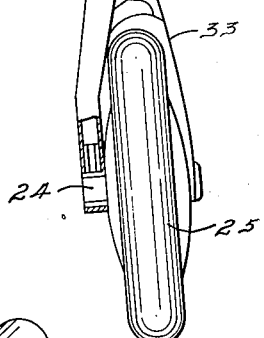
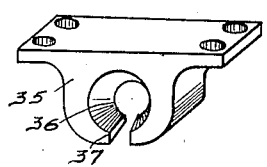
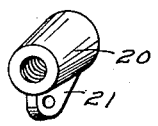
Inventor.
GEORGE M. LEWIS.
by
Harness, Dickey & Pierce
Attorneys Patented Dec. 3, 1929

1,737,596

UNITED STATES PATENT OFFICE

GEORGE M. LEWIS, OF DETROIT, MICHIGAN

AIRPLANE

Application filed July 13, 1929. Serial No. 377,981.

This invention relates to landing gear for airplanes, the principal object being the provision of a new and novel construction, simple in design and efficient in operation.

Another object is to provide a landing gear for airplanes so constructed that all of the struts and the wheels may be concealed in the wing when the gear is in folded position.

Another object is to provide a retractible landing gear for airplanes including a screw concealed within the wing of an airplane, a nut travelling on the screw, a wheel supporting leg pivotally connected to the nut, and a strut pivotally connected to the leg and to a stationary part of the airplane.

Another object is to provide a construction as above described in which means are provided for relieving the screw of any bending stresses when the wheel is in unfolded position.

Another object is to provide, in a landing gear of the type described, a means for bracing the anchored end of the leg against longitudinal movement independently of the wing when the wheel is in unfolded position.

A further object is to provide means for lessening the stresses set up in the landing gear parts when the gear is in folded position.

The above being among the objects of the present invention, same consists in certain novel features of construction and combinations of parts to be hereinafter described with reference to the accompanying drawing, and then claimed, having the above and other objects in view.

In the accompanying drawing, which illustrates the suitable embodiment of the present invention, and in which like numerals refer to like parts throughout the several different views, Fig. 1 is a fragmentary partially broken more or less diagrammatic view of an airplane wing and co-operating parts illustrating a suitable embodiment of the present invention with the gear in retracted position.

Fig. 2 is a view similar to Fig. 1 but showing a landing gear in operative position for landing purposes.

Fig. 3 is a reduced and more or less diagrammatic sectional view taken as on the line 3—3 of Fig. 2.

Fig. 4 is a perspective view of the socket member employed at the outer end of the operating screw for the landing gear.

Fig. 5 is a perspective view of the nut which travels upon the screw.

In the accompanying drawing I show the present invention in connection with an airplane having a centrally disposed hull 10 from which projects a laterally outwardly extending stub wing 11, the outer end of which is provided with a downwardly extending float or pontoon 12 for the purpose of stabilizing the airplane when upon water. Only a fragment of one side of the airplane is shown as it will be understood that the construction of the opposite side and the gear carried thereby is identical but reversed in position to that shown. It is to be understood, however, that the present invention is not limited to the amphibian type of airplane shown having the hull 10 and floats 12 connected together by stub or other wings, but is equally applicable to the land type of planes in which the only difference of construction as far as the present invention is concerned is that the hull 10 would be replaced by the fuselage of the airplane, and it will be further understood in connection with the drawing that the float 12 bears no relation to the present invention and is shown merely to illustrate the present invention in connection with a suitable type of airplane.

In accordance with the present invention, I position a screw shaft 13 within the wing 11 and extending longitudinally thereof, that is, transversely to the length of the airplane. This screw shaft is preferably supported adjacent the top of the wing but completely enclosed therein. This screw shaft 13 may be supported in any suitable manner against axial movement, the means shown comprising a bracket member 14 rotatably supporting the outer end of the screw shaft and a bracket member 15 secured to the side of the hull 10 for supporting the inner end of the screw shaft. Any suitable means, manually operated or power driven, may be provided for rotating the screw shaft 13, the particular means shown comprising a sprocket 16 non-rotatably secured to the shaft 13 within the hull 10, the sprocket being connected by a chain such as 17 to the sprocket 18 of a reversible electric motor 19 preferably positioned within the hull 10. Received on the shaft 13 is a nut 20 best shown in perspective in Fig. 5 and provided with an apertured flange 21 integrally secured thereto. A wheel supporting leg 23 is pivotally connected at one end to the flange 21. The opposite end of the leg 23 is provided with a wheel spindle 24, upon which a wheel 25 of suitable construction is rotatably mounted. The leg 23 may be of rigid construction but is preferably of the extensible and contractable resilient type adapted to absorb the shocks of landing.

Referring to Fig. 2 it will be noted that immediately above the wheel 25 the leg 23 is provided with an inwardly extending flange 26 to which is pivotally connected the outer ends of a pair of divergent strut members 27, whose inner ends are pivotally connected to the side of the hull 10 by brackets 28 positioned forwardly and rearwardly of the wheel 25 with respect to the longitudinal axis of the airplane. The brackets 28 are located at a substantial distance below the shaft 13 but preferably near or within the lower surface of the wing 11 when the thickness of the wing permits. The wing itself is provided with a central slot 29, within which the leg 23 is received when the gear is swung to inoperative position and is further provided with a pair of diverging slots 30 in its lower surface, within which the struts 27 are adapted to be received when the gear is moved to inoperative position. It will be apparent that with this construction the leg 23 maintains the nut 20 against relative rotation on the shaft 13 and that as the shaft 13 rotates the nut 20 will be caused to travel along the shaft 13 in one direction or another, depending upon the direction of rotation of the shaft.

Assuming that the parts are in operative position for landing purposes, as illustrated in Fig. 2, and assuming that the screw shaft 13 is rotated to move the nut 20 inwardly on the shaft, the upper end of the leg 23 will be carried inwardly with the nut 20 and an intermediate point of the leg 23, adjacent to the point at which the struts 27 are connected thereto will be caused to swing upwardly about the pivotal center between the struts 27 and the brackets 28, with the result that the wheel 25 will be moved in an upwardly and outwardly direction with respect to the hull 10.

In order to permit the wheel 25 to move up into the wing 11 and to be substantially fully concealed therein when in inoperative position, the wing 11 is provided with a wheel receiving pocket 32. It will be noted from an inspection of Fig. 1 that when the nut 20 has moved inwardly far enough to swing the wheel 25 into the pocket 32, the leg 23 and struts 27 will have also been moved into their respective slots 29 and 30 so as to also be concealed within the wing. This construction is such as to expose a minimum amount of air disturbing surfaces necessitated by the landing gear when the landing gear is in retracted position. If desired, this resistance may be further reduced by the provision of fairing such as 33 carried by the leg 23 and acting to close the lower faces of the recess 32 and part of the grooves 29 and 30 when the gear is moved to fully retracted position, and thus more fully streamline the under surface of the wing.

In landing gears of this type it is essential that ample means must be provided to withstand the stresses set up in the wing due to shocks experienced in landing, and it is preferable that such shocks will not be transmitted to the screw shaft 13 itself so as to exert a bending action upon it. According to the present invention I take care of these features in the following manner. Preferably formed integrally with the bracket 14 at the outer end of the screw shaft 13 I provide a socket member 35, best shown in Fig. 4, which is provided with a tapered opening 36 therein extending axially of the shaft 13. The socket member 35 is provided with a slot 37 in the lower face thereof leading into the opening 36. The outer face of the nut 20, as indicated best in Fig. 5, is tapered to a shape complementary to the opening 36 in the member 35 and is adapted when moved to its extreme outer position to be received within the opening 36 and be socketed therein. The flange 21 on the nut 20, when the nut 20 is in socketed relation with relation to the socket member 35, is received within the slot 37.

By this construction it will be apparent that when the nut 20 is moved to its extreme outer position and is socketed within the socket member 35 the forces transmitted from the wheel 25 through the leg 23 is transmitted from the nut 20 through the member 35 directly to the bracket 24 without exerting any bending force whatever upon the screw shaft 13. In order to transmit and distribute these shocks and forces from the bracket member 14 to the airplane, and to sustain the weight of the airplane through the wheels 25, I extend the struts such as 40 and 41 from the upper wings (not shown), or from the upper portion of the hull 10, to the bracket 14 and secure them thereto. The struts 40 and 41, or any additional struts that may be employed, thus serve to distribute the shocks and forces from the bracket 14 to relatively widely separated areas of the airplane.

In order to brace the bracket 14 and, therefore, the wheel 25 against the forces set up longitudinally of the airplane in landing, I extend a pair of inwardly diverging struts 42 from the bracket 14 to the side of the hull 10. These struts 42 are preferably concealed within the wing 11 in order to cut down any possible air resistance that they would otherwise offer, and act to relieve the wing itself from the effects of longitudinally acting forces on the wheel.

Where both the screw shaft 13 and the connecting point between the struts 27 and the brackets 28 are positioned within the surface of the wing 11, the vertical distance between the shaft 13 and the point of connection between the struts 27 and brackets 28 may be so small as to set up relatively great forces in the screw shaft 13 and struts 27 when the gear is in folded position and the airplane is subjected to vertical shocks such as in landing upon water. In order to relieve these members as much as possible from such shocks and stresses I have provided a bracket member 43 rigidly supported within the wing 11 adjacent the position of the nut 20 when the nut is at its innermost limit of travel. I also form one surface of the leg 23 adjacent its point of connection with the nut 20 to provide a cam-like surface 44, and on the bracket 43 I provide a complementary surface 45, so that when the screw 20 has moved to its extreme inward position of movement the cam surfaces 44 and 45 co-operate not only to support the nut 20 at this point independently of the shaft 13, but also tend to aid in swinging the gear into fully retracted position.

It will be apparent that with the above described construction an extremely simple and efficient retractable landing gear for airplanes is provided and one in which ample means are provided for resisting the stresses to which such landing gear and the airplane supported thereby may be subjected in landing or in flight, and that when retracted a minimum air resistance is offered by the gear. It will also be apparent that this construction is applicable to a wide variety of airplane constructions and its application is not to be understood as being limited to the particular airplane construction described. It will also be apparent that the particular size, shape and construction of the various elements may be varied, and these and other formal changes may be made in the specific embodiment of the invention described without departing from the spirit and substance of the broad invention, the scope of which is commensurate with the appended claims.

What I claim is:

1. In an airplane, in combination, a wing, a pocket formed in the lower surface of said wing, and a retractable landing gear comprising a screw received in said pocket and extending in the direction of length of said wing, a travelling nut on said screw positioned at the outer end of said screw when said gear is in unfolded position, a wheel supporting leg pivoted at one end to said nut and provided with a wheel at its opposite end, a strut pivotally connected to said leg between the ends thereof and extending inwardly of said wing in respect thereto, means for pivotally connecting the inner end of said strut to a stationary part of said airplane below said screw, and means to rotate said screw.

2. In a retractable landing gear, a screw, a nut adapted to travel on said screw, a leg pivoted at one end to said nut and carrying a wheel at the opposite end, a strut pivotally connected at one end to said leg between the ends thereof and pivotally connected to a relative stationary part of said plane at its opposite end, said nut having a tapered outer surface, and a stationary member surrounding said screw and having a tapered socket therein complementary to said tapered surface of said nut for socketing said nut when said nut has moved on said screw to place said gear in operative position.

3. In an airplane, in combination, a fuselage, a wing, and a retractable landing gear comprising a screw received within said wing and extending longitudinally thereof, a nut adapted to travel back and forth on said screw, a leg pivotally connected at one end to said nut and carrying a wheel at its opposite end, a strut pivotally connected at one end to said leg between the ends thereof and pivotally connected to a relatively stationary part of said airplane at its opposite end, a member for socketing said nut when said nut has moved to place said gear in operative position, and wing supporting struts connected at their lower ends to said member.

4. In an airplane, in combination, a fuselage, a wing, and a retractable landing gear comprising a screw received within said wing and extending longitudinally thereof, a nut adapted to travel back and forth on said screw, a leg pivotally connected at one end to said nut and carrying a wheel at its opposite end, a strut pivotally connected at one end to said leg between the ends thereof and pivotally connected to a relatively stationary part of said airplane at its opposite end, a member for socketing said nut when said nut has moved to place said gear in operative position, and a plurality of downwardly extending wing struts converging at said member and connected thereto.

5. In an airplane, in combination, a fuselage, a wing, and a retractable landing gear comprising a screw received within said wing and extending longitudinally thereof, a nut adapted to travel back and forth on said screw, a leg pivotally connected at one end to said nut and carrying a wheel at its opposite end, a strut pivotally connected at one end to said leg between the ends thereof and pivotally connected to a relatively stationary part of said airplane at its opposite end, a member for socketing said nut when said nut has moved to place said gear in operative position, and bracing struts concealed within said wing connected at one end to said member and connected at their opposite ends to the fuselage of said airplane at points forwardly and rearwardly disposed relative to said member.

6. In an airplane, in combination, a screw, a nut movable on said screw, a leg pivoted at one end to said nut and carrying a wheel at its opposite end, a strut pivoted to said leg intermediate the ends thereof and pivotally connected to a relatively stationary part of said airplane, said screw being rotatable to move said nut towards one end thereof to place said wheel in retracted position, and means engageable with said leg at a point intermediate said nut and said wheel upon a predetermined movement of said wheel toward retracted position cooperating with said leg to maintain said wheel in retracted position.

7. In an airplane, in combination, a screw, a nut movable on said screw, a leg pivoted at one end to said nut and carrying a wheel at its opposite end, a strut pivoted to said leg intermediate the ends thereof and pivotally connected to a relatively stationary part of said airplane, said screw being rotatable to move said nut towards one end thereof to place said wheel in retracted position, and means engageable with said leg when said wheel is in retracted position acting to maintain said wheel in retracted position, said means comprising a fixed cam member and a co-operating face on said leg co-operable to urge said leg upwardly relative to said screw.

GEORGE M. LEWIS.